(12) United States Patent
Elhabr

(10) Patent No.: US 6,778,372 B2
(45) Date of Patent: Aug. 17, 2004

(54) CONTROLS FOR LOADS SUCH AS AIR CONDITIONER COMPRESSORS

(75) Inventor: Ziad Elhabr, Rahway, NJ (US)

(73) Assignee: Zeal-Services, LLC, Rahway, NJ (US)

( * ) Notice: Subject to any disclaimer, the term of this patent is extended or adjusted under 35 U.S.C. 154(b) by 364 days.

(21) Appl. No.: 09/789,475

(22) Filed: Feb. 20, 2001

(65) Prior Publication Data

US 2002/0012217 A1 Jan. 31, 2002

Related U.S. Application Data

(60) Provisional application No. 60/183,118, filed on Feb. 17, 2000.

(51) Int. Cl.[7] .................................................. H02H 5/04
(52) U.S. Cl. ....................................... 361/103; 361/93.8
(58) Field of Search ................................. 361/103, 93.8; 318/484

(56) References Cited

U.S. PATENT DOCUMENTS 3,864,611 A * 2/1975 Chang ........................ 318/484
6,204,747 B1 * 3/2001 Kitchens ..................... 337/407

* cited by examiner

Primary Examiner—Brian Sircus
Assistant Examiner—James A Demakis
(74) Attorney, Agent, or Firm—Leo Stanger

(57) ABSTRACT

In a monitor for an inductive load recycling by a thermal cut-off sensor is prevented by maintaining an off condition with a delay. The delay has an adjustable time in excess of the cut-off sensor's reset time.

14 Claims, 2 Drawing Sheets

CONTROLS FOR LOADS SUCH AS AIR CONDITIONER COMPRESSORS

This application claims the benefit of Provisional application No. 60/183,118 filed Feb. 17, 2000.

FIELD OF THE INVENTION

This invention relates to protective monitors or controls, and particularly to monitors or controls for protecting compressors in air conditioning units.

BACKGROUND OF THE INVENTION

Loads such as motors in air conditioning units, especially air conditioning compressors, may draw excessive currents and overheat during operation. To protect the compressor and the unit from the effects of overheating, a thermal protective device in the unit may cut off further flow to the compressor. The protective sensor device later allows current to the unit to resume. However, the thermal protective sensor often allows current to restart before the unit has actually recovered from its overloaded condition. Then the thermal protective device again cuts off current. This cut off and resumption of current may recycle many times before system operates normally. Repeated cycling shortens the life of the sensor contacts as well as the compressor.

An object of the invention is to overcome these difficulties.

SUMMARY OF EMBODIMENTS OF THE INVENTION

According to an embodiment of the invention, a thermal protector opens in response to excess current or heat and a delay defers resumption of current flow through the thermal protector by a period that extends beyond the expected current resumption.

According to an embodiment a reset relay responds to the delay to maintain the off condition during an adjustable period.

According to an embodiment this is accomplished by an arrangement external to the unit.

The various features that characterize the invention are pointed out in the claims forming a part of this specification. Other objects and advantages of the invention will become evident from the following detailed description when read in light of the following drawings.

DETAILED DESCRIPTION OF PREFERRED EMBODIMENTS

Figure 1:
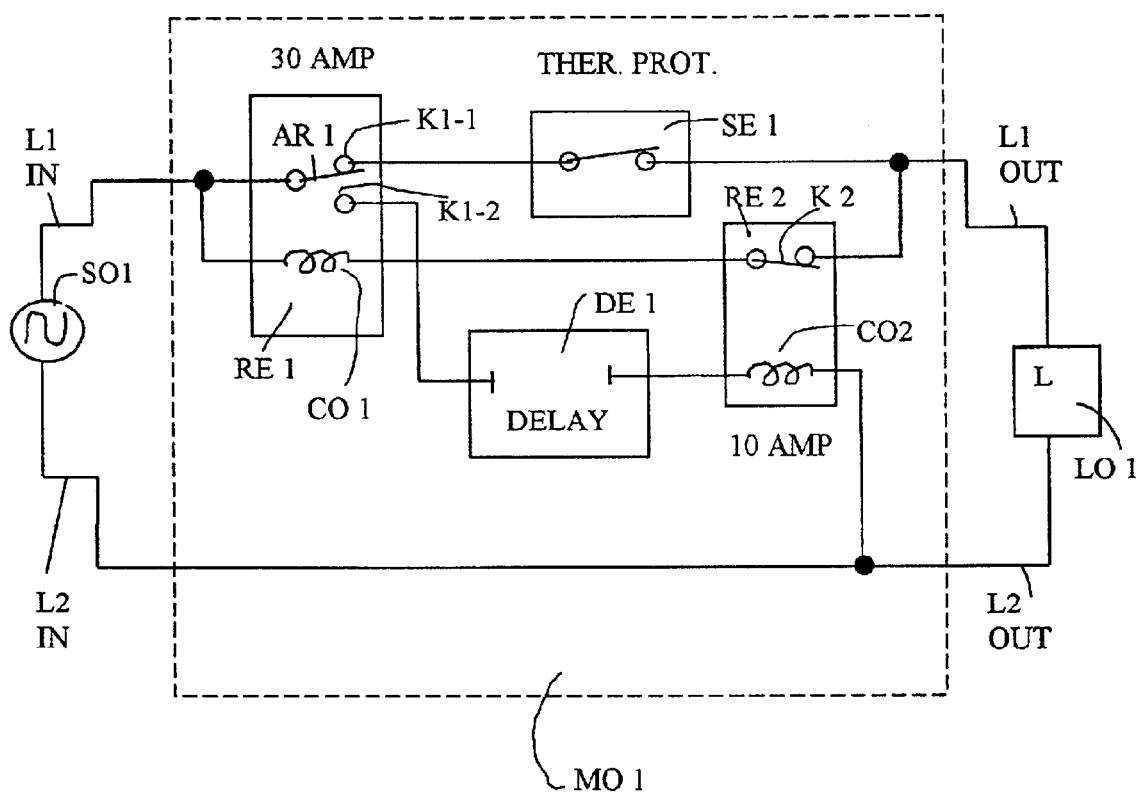
FIG. 1 is a schematic drawing illustrating an embodiment of the invention.

In FIG. 1, a monitor MO1 embodying the invention appears between a power source SO1 and an inductive load LO1 such as an industrial air conditioning unit. In the un-energized state, suitable means (not shown) bias an armature AR1 of a single-pole double-throw relay RE1 upward as illustrated in the drawing and into connection with a contact K1-1 of the relay RE1. This permits current flow from the source SO1 through an input lead L1IN, through the armature AR1, and through a normally closed thermal protection heat sensor SE1 to an output lead L1IN and the load LO1. The current returns through lines L2OUT, LT2IN to the source SO1. Normal current can thus flow from source to load.

In case of an overload and current rising above a predetermine value, the thermal protection heat sensor SE1 heats up, senses the overload, and opens. This cuts power from the source SO1 to the load LO1. This closes a path from the source SO1 through the coil CO1 of the relay RE1 via a normally closed contact K2 of a single-pole single-throw relay RE2, and to the load LO1. This path has sufficiently high impedance to limit current to less than 5 amperes. This low current switches the armature AR1 of the relay RE1 to the contact K1-2. As a result current starts to flow through an adjustable normally-conductive time delay DE1, through a coil CO2 of a relay RE2. The term normally-conductive means conductive when un-energized or energized below a predetermined current value.

The start of the current immediately pulses the delay DE1 and renders the latter substantially non-conductive for an adjustable period such as 6 to 300 seconds. The term non-conductive in this instant means insufficiently conductive to actuate the coil CO2 of the relay RE2. More specifically the rating of the relay coil CO2 is such as to prevent the initial current therethrough and the current of the non-conductive delay DE1 from actuating the relay RE2. Hence the normally closed contact K2 keeps coil CO1 energized, which pulls the armature AR1 of the relay RE1 downwardly (in the drawing) against the contact K1-2. This cuts off, and continues to cut off, current between the source SO1 and load LO1 through the thermal sensor SE1.

After the thermal sensor senses a reduction of the temperature to its predetermined level, the sensor SE1 closes its contacts. However the delay DE1 still keeps the contact K2 closed. The adjusted delay period of the delay DE1 to its conductive condition is sufficiently long to outlast the resumption of the sensor SE1 to its conductive condition.

When the delay DE1 has completed the specified period, it turns conductive and allows a sufficiently heavy current flow through the downwardly (in the drawing) pulled armature AR1 and through the coil CO2 of relay RE2 to open the contact K2. This cuts off power to the coil CO1 of relay RE1. Armature AR1 snaps to its up (in the drawing) un-energized position and allows current to resume from the source SO1 to the load LO1 through the armature and the now conductive sensor SE1. Such current flows because the sensor SE1 has reset itself from the thermally-activated non-conductive condition. As stated, the adjusted delay period of the time delay DE1 is selected to exceed the expected time in which the sensor SE1 resets itself. The closed contact K1-1 and the conductive sensor SE1 in effect short any current flow through the coil CO1 and the contact K2. Operation of the load LO1 then resumes.

According to an embodiment, the time period of the delay DE1 is adjustable from 6 to 300 seconds, although other delays are possible. The delay is set sufficiently large so as to exceed the recycle time of the thermal sensor SE1. This prevents the sensor from turning non-conductive in response to excessive current indicative of a power excess, turning conductive in response to reduced current flow, and then turning non-conductive again when the excess current in the load LO1 resumes. Keeping the system off for additional time forestalls premature resumption of operation and subsequent on-off cycling.

According to an embodiment of the invention the sensor SE1 responds to excess current or temperature before any internal protective device in the air conditioner. For example an air conditioner protector may wait 16 seconds after reaching 135F. and then cut off. The sensor SE1 is the set to wait 6 to 15 seconds after reaching 120F. Also the current path through the coil CO1 may carry reverse current from the inductive load.

Figure 2:
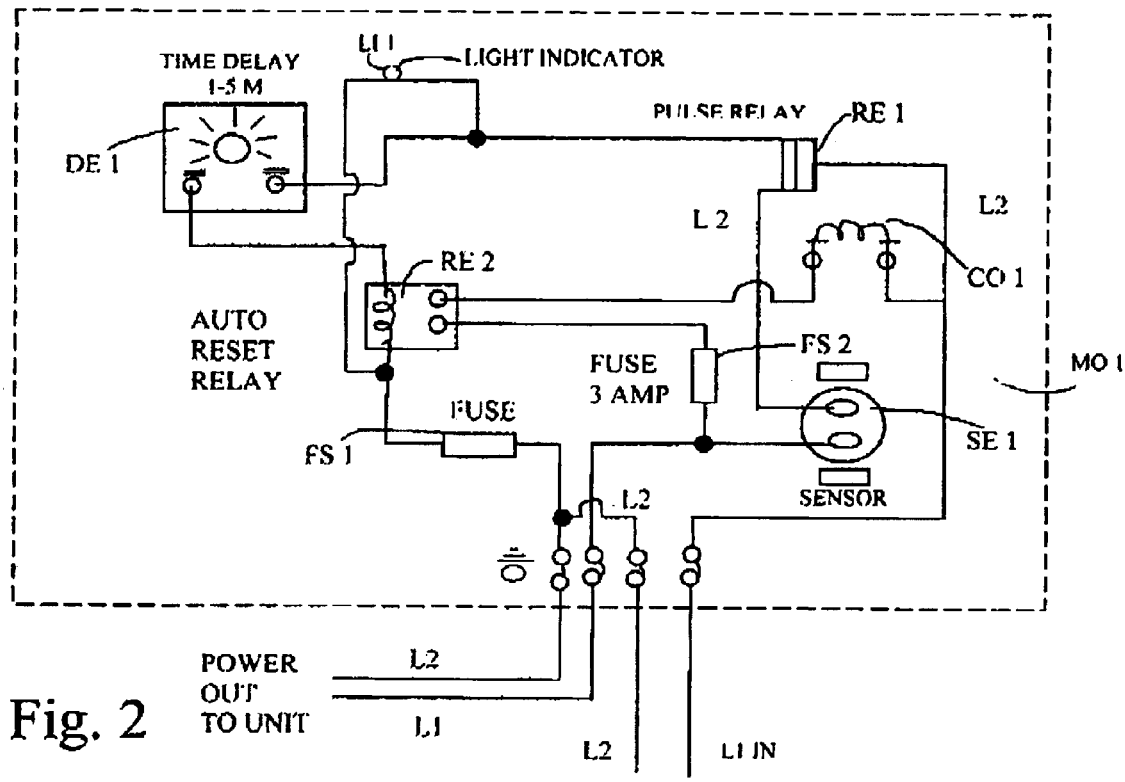
FIG. 2 is a schematic drawing illustrating other details of the embodiment of FIG. 1

FIG. 2 illustrates a variation of the embodiment in FIG. 1. Like parts are designated with like characters. FIG. 2 illustrates fuses FS1 and FS2 as well as a light indicator LT1.

Figure 3:
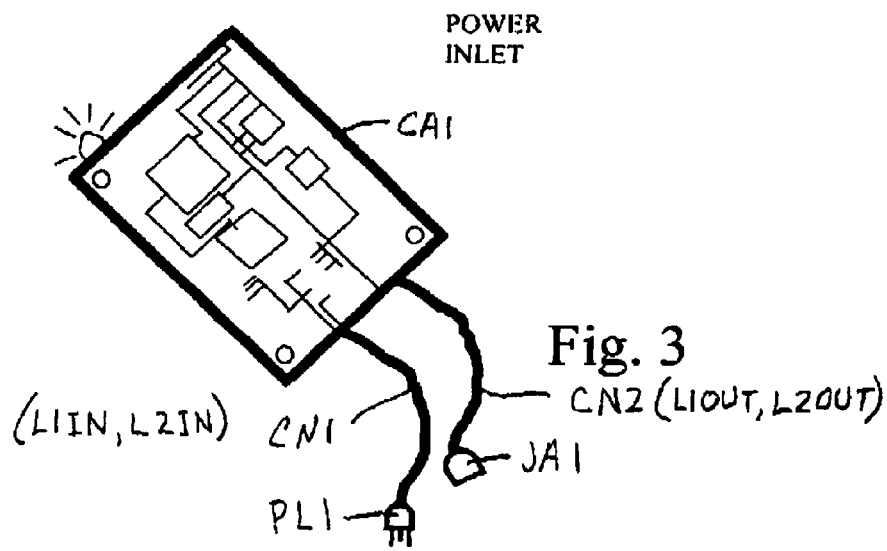
FIG. 3 is a cross-sectional view of a monitor such as that of FIG. 1 or 2 in a casing with connectors.

FIG. 3 is a perspective view of the monitor in a case CO1 with connectors CN1 and CN2 (having lines L1IN, L2IN and L1OUT, L2OUT), a plug PL1 and a jack JA1.

The invention provides the benefit of preventing premature resumption of current through the load LO1 and protecting the contacts of the sensor SE1. It inhibits wear-out of the sensor from the effects of repeated on-off cycles. It similarly protects the compressor or the air conditioner from the repeated on-off operations, and the consequence of early recurrences of current flow. The sensor, in one embodiment, includes a temperature sensitive bimetallic thermostat where the bimetal makes or breaks with a contact.

According to an embodiment, the load LO1 is the compressor of the air conditioning unit. In another, it includes the entire unit. The unit may have an internal thermal protector. Typically, the internal protector may cut out at 130 degrees F. and resets in 16 seconds, although other values exist. The thermal protective sensor SE1 is current sensitive and heats; cuts out at a lower temperature, for example at 120 degrees F. although other temperatures may also be used and resets in 6 to 300 seconds. In an embodiment the sensor SE1 cuts back in at 78 degrees F. and the delay DE1 is long enough to prevent current return until after the temperature has fallen even further.

While embodiments of the invention have been described in detail, it will be evident to those skilled in the art that the invention may be embodied otherwise.

What is claimed:

1. An overload control unit for a load having a heat-sensing protective switch in said load, said control unit comprising:

input leads for connection to the source;

output leads for connection to the load;

a normally closed current-responsive heat-sensing on-off switch in series between said input leads and said output leads, said on-off switch having an expected recovery time in response to heat-energization thereof;

a normally-closed start-stop delay switching arrangement responsive to opening of said on-off switch with said on-off switch to hold said on off switch open, with said delay switching arrangement having a preset delay time between starting and stopping, said delay time exceeding the expected recovery time;

said current-responsive heat-sensing on-off switch being responsive to turn off prior to the heat-sensing protective switch in said load;

said unit having a casing for said current-responsive heat-sensing on-off switch and said delay switching arrangement, said casing being separate from the load.

2. A control unit as in claim 1, wherein said input leads include an electrical plug for insertion into an electrical outlet, and said output leads include a jack to receive a plug from the load.

3. A control unit as in claim 2, wherein said switching arrangement includes a normally-closed supplementary switch in series with said on-off switch and coupled with said on-off switch to open in response to opening of said on-off switch.

4. A control unit as in claim 3 wherein said switching arrangement includes a delay device coupled to said supplementary switch to start the delay time, and coupled back to close the supplementary switch at the stopping of the delay time.

5. A control unit as in claim 4 wherein said supplementary switch has an off-position connecting said input lead to said delay device.

6. A control unit as in claim 5, wherein said supplementary switch include a control member;

said delay device includes a delay having an input coupled to said off-position of said supplementary switch and an output; and a recovery switch coupling said output to the off-position of said control member.

7. A control unit as in claim 6, wherein said supplementary switch is a relay with double throw contacts.

8. A control unit as in claim 7, wherein said control switch is a relay with a coil connected to the output of the delay.

9. A control unit as in claim 8, wherein said control switch includes a normally-closed contact coupled to said coil of said relay in said control switch, said supplementary switch includes a relay coil in series with said contact of said control switch.

10. A control unit as in claim 2, further comprising a housing for said on-off switch and said switching arrangement, said input leads with said plug and said output leads with said jack projecting from said housing so said control unit can be plugged and unplugged between outlet and load.

11. An overload control unit for a load comprising:

input leads for connection to the source;

output leads for connection to the load;

a normally closed heat-sensing on-off switch in series between said input leads and said output leads, said on-off switch having an expected recovery time in response to heat-energization thereof;

a normally-closed start-stop delay switching arrangement responsive to opening of said on-off switch with said on-off switch having a preset delay time between starting and stopping, said delay time exceeding the expected recovery time;

said input leads being connectable and disconnectable from the source, said output leads being connectable and disconnectable from the load.

12. A control unit as in claim 11, wherein said input leads include an electrical plug for insertion into an electrical outlet, and said output leads include a jack to receive a plug from the load.

13. A control unit as in claim 12, further comprising a housing for said on-off switch and said switching arrangement, said input leads with said plug and said output leads with said jack projecting from said housing so said control unit can be plugged and unplugged between outlet and load.

14. A stand alone protective apparatus for connection between a source and a load having an internal heat responsive device with a predetermined recovery time, comprising:

an input lead with a plug, and an output lead with a jack both projecting from said housing;

a normally-closed heat-sensing on-off switch in series between said input leads and said output leads, said on-off switch opening in response to heat-energization and having an expected recovery time to close after response to heat-energization thereof;

a normally-closed start-stop delay switching arrangement responsive to opening of said on-off switch with said on-off switch having a preset delay time between starting and stopping, said delay time exceeding the expected recovery time and the predetermined recovery time;

said heat sensing on-off switch being arranged to open earlier than the heat responsive recovery device of said load.

* * * * *